Aug. 14, 1951     H. E. SPECHT     2,564,512
COMBINATION BED AND TABLE FOR TRAILERS
Filed March 21, 1947     2 Sheets-Sheet 1

Inventor
Henry E. Specht

Aug. 14, 1951  H. E. SPECHT  2,564,512
COMBINATION BED AND TABLE FOR TRAILERS
Filed March 21, 1947  2 Sheets-Sheet 2

Inventor
Henry E. Specht

By *Clarence A. O'Brien
and Harvey B. Jacobson*
Attorneys

Patented Aug. 14, 1951

2,564,512

UNITED STATES PATENT OFFICE 2,564,512

COMBINATION BED AND TABLE FOR TRAILERS

Henry E. Specht, Newton, Ill.

Application March 21, 1947, Serial No. 736,284

1 Claim. (Cl. 5—2)

This invention relates generally to furniture, and more particularly to a combination bed and table for a house trailer.

It is a primary object of this invention to provide a combination bed and table which are also adapted for use with a pair of laterally disposed seats, in one end of a house trailer, the said seats providing support for the bed when this bed is in depressed position, the bed being pivotally secured to one edge of each of said seats and adapted to be swung upwardly into the end of the trailer when not in use.

A further object of the invention is to provide a foldable table which may be folded flat on the underside of the bed or extended outwardly and supported in a horizontal position by a movable supporting member of cabinet character.

It is another object of this invention to provide convenient and attractive means for securing the bed and table in upwardly swung position.

And it is another object of this invention to provide for a full-sized bed, seats which are fully available for use when the bed is in upwardly swung position, and to generally arrange the component parts of this invention in a manner providing for maximum convenience and full utilization of the space within the trailer.

And a last object to be specifically mentioned is to provide a device of this character which is relatively inexpensive and practicable to manufacture, extremely simple and easy to use, very attractive in appearance, and generally adapted to give efficient service.

With these and other objects definitely in view, this invention resides in certain novel features of construction, combination and arrangement of parts and portions as will be hereinafter described in detail and particularly set forth in the appended claim, reference being had to the accompanying drawings which form a material part of this application and in which:

Similar characters of reference designate similar or identical parts and portions throughout the specification and throughout the several views of the drawings.

Figure 1:
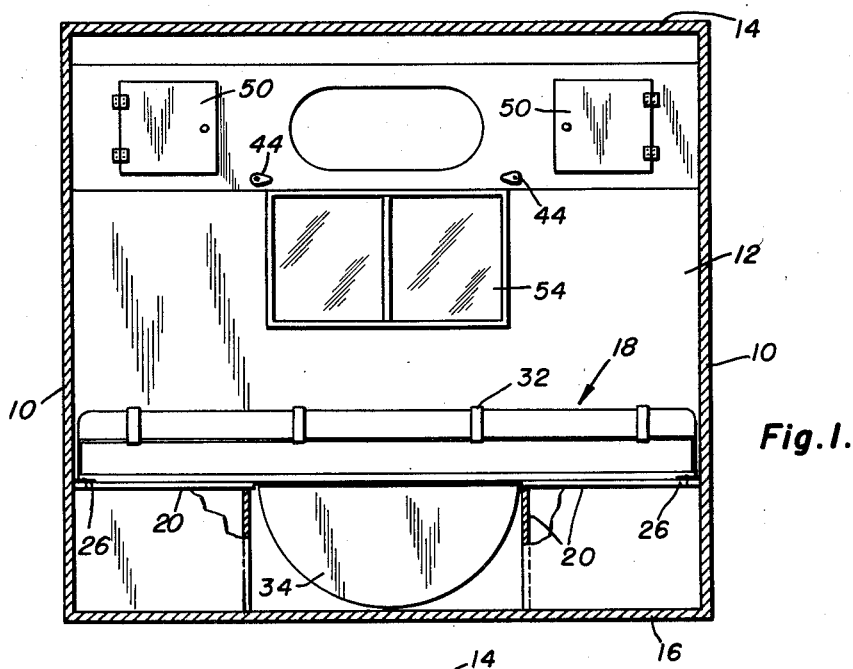
Figure 1 is technically a transverse vertical sectional view, looking rearwardly, of a trailer equipped with this invention, the trailer body being simply illustrated as of rectangular cross-sectional shape, and the bed being shown in downwardly swung or horizontal position.
Figure 2:
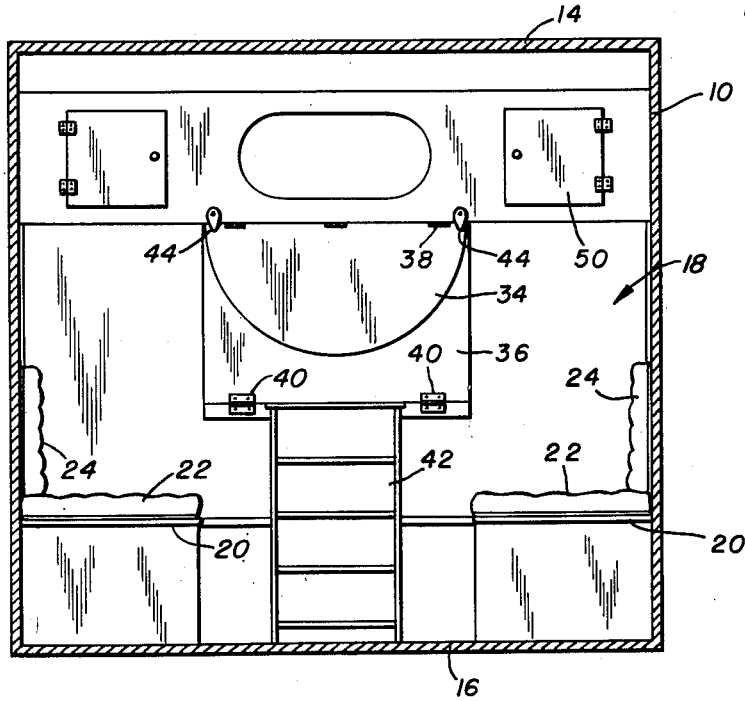
Figure 2 is a similar view, but with the bed shown in upswung position, the table folded and fastened in upright or stored position, and the cabinet used for supporting the outer end of the table when the same is being used being shown at the center part of the figure.
Figure 3:
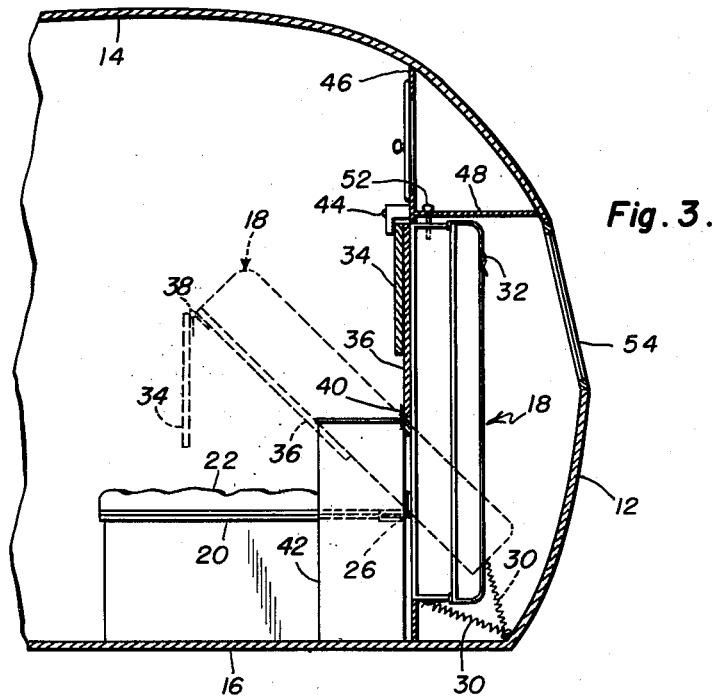
Fig. 3 is a side elevational view with parts broken away and parts shown in section.
Figure 4:
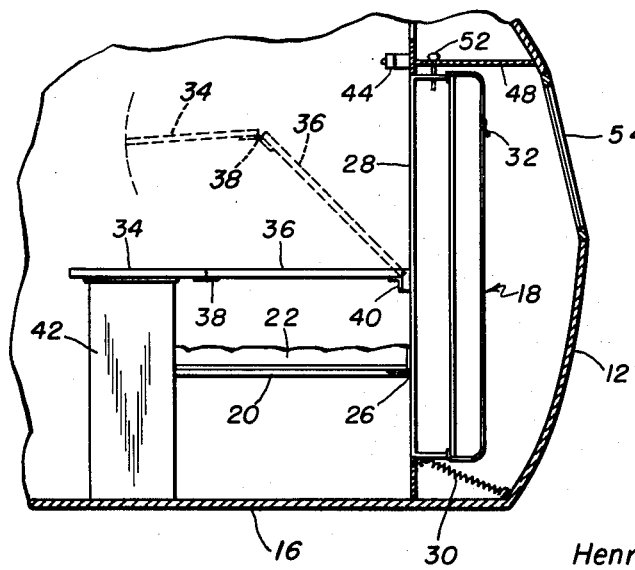
Figure 4 is a side view similar to Figure 3, but showing the table in elevation in depressed position and supported terminally by the said cabinet member, the table being shown in an intermediate position in dash lines, to facilitate the illustration and to generally amplify the disclosure of this invention.

Referring to these drawings in detail, it will be noted that the body portion of the trailer has been represented by the vertically sectioned walls 10, in Figures 1 and 2, an end wall 12, in Figures 3 and 4, a ceiling 14 and a floor 16.

Since the improved trailer construction described herein is symmetrical about the longitudinal center line of the trailer, it will be necessary to describe, in detail, the construction of the component parts on one side of the trailer. It will be understood, however, that the bed, generally indicated by the numeral 18, preferably but not necessarily extends transversely across substantially the full width of the trailer.

On each side of the trailer and longitudinally disposed thereof there is provided a seat 20 which may be of box-like character, in order that the rectangular space within the seat may be utilized for storage, and these seats will be ordinarily equipped with seat cushions 22 and a backrest 24. The bed 18 is pivotally secured, as at 26, to the rear edges of these seats 20, these hinge connections 26 being located on the frame portion of the bed 18, intermediate the length thereof, and ordinarily at a distance from the rear or lower end of the bed considerably less than the height of the seat 20 from the floor 14, in order that this rear or lower end of the bed will have ample clearance when the bed is in upswung position.

Since the exact structure of the bed is not material in this application, the drawings represent a simple panel 28 as representing the frame of the bed, and the hinge connections 26 will be understood to be secured to this panel 28. The above referred to clearance between the end of the bed and the floor facilitates the provision of a weight counterbalancing spring 30 which may be secured to the end of the panel 28 or to some other contiguous portion of the bed and to the floor 16, the length of this spring 30 being such that the bed is biased into an intermediate position, thus facilitating both the lowering and the raising of the bed. It is preferred that the bed be provided with longitudinally disposed strap members, a plurality of these straps being arranged in spaced positions on the bed and used to fasten the bed clothing and mattress firmly onto the frame of the bed, prior to swinging the bed upwardly to the position illustrated in Figures 3 and 4, the exact arrangement and character of these strap portions 32 being a matter of individual preferment and mechanical expediency and not particularly material in this disclosure.

A table comprised of two panels 34 and 36, hingedly secured together as at 38, is secured by other hinges 40 to the panel 28 of the bed, the drawings representing a preferred form of table in which the panel 36 is rectangular and is marginally secured to the panel 28, and the panel 34 is substantially semi-circular. It will be noted that this table may be positioned in a horizontal plane and supported at the outer end by means of the cabinet 42, which cabinet functions as a movable support for the table and may be of any desired form. The table can be folded on the hinges 38 and 40, into vertical position and disposed flat on the underside of the bed, that is, parallel with the panel 28, and when in this position, the table may be locked by decorative clip means 44. These clip members 44 will ordinarily be pivotally secured to the frame of the trailer, and in the drawings, a preferred form of construction is illustrated and includes a vertical wall 46 and a horizontal wall portion 48 which provide for a convenient storage space at the top of the trailer, access to this storage space being provided by doors 50. These doors 50 may be used to allow access to pins 52 insertable through the wall portion 48 and into a registering portion of the frame of the bed, when this bed is in upswung position, whereby the bed is retained in position when it is desired to unlatch the table and to depress the same into the position shown in Figure 4.

It is preferred that the trailer should be equipped with a window or air vent 54, at the rear of the trailer, in order to provide for proper ventilation of the bed and the sleeping compartment, and it will be noted that the bed and table may be both simultaneously depressed in order that this closure 54 may function as a rear-view window, allowing vision through the trailer and the forward end of the trailer is also similarly provided with a window, this last feature being mentioned in this application in order to show that the combination bed and table may be used without increasing operating hazards in any way.

The operation of this invention will be clearly understood from the foregoing description of the mechanical details thereof, taken in connection with the above recitation of the objects sought to be achieved by this invention but, in recapitulation, it may be noted that the cabinet 42 is not necessarily mechanically linked to the remaining structure, serving only as a support for the table when the same is in depressed position. It may also be noted that the cushions 22 and 24 will ordinarily be removed from the seats 20 prior to the lowering of the bed 18, and that these cushions may be adapted for use in connection with the bed, if so desired.

Though there has been shown a particular embodiment of this invention, this application is not limited to this particular embodiment, but it is desired to include in the scope of this invention the construction, combination and arrangement of parts and portions substantially as set forth in the appended claim.

What is claimed as new and desired to be secured by Letters Patent of the United States is:

In combination with a trailer a pair of seats disposed longitudinally of the trailer in laterally facing relation and adjacent one end thereof, a bed having an intermediate portion thereof pivotally secured to the ends of said seats adjacent said end of said trailer, and adapted to be swung upwardly into substantially vertical position transversely of said end and to be swung downwardly to rest upon said seats, a folding table pivotally secured at one end thereof on the underside of said bed, and a movable support for the outer end of said table when said bed is swung upwardly and said table is unfolded outwardly, said table comprising two hinged panels, one of said panels being pivoted on said underside, said panels being foldable parallel to said underside so that the folded edge of the table is adjacent the upper edge of the bed when the bed is in upswung position, fastening means on the trailer directly engaging the bed to retain said bed in upswung position and further fastening means on the trailer engaging the folded edge of the table to retain said table in folded position on the underside of the bed when the said bed is in upswung position.

HENRY E. SPECHT.

REFERENCES CITED

The following references are of record in the file of this patent:

UNITED STATES PATENTS

| Number | Name | Date |
|---|---|---|
| 201,282 | Ogborn | Mar. 12, 1878 |
| 444,741 | Brandenburg | Jan. 13, 1891 |
| 1,334,993 | Fry | Mar. 30, 1920 |
| 1,732,481 | Miller et al. | Oct. 22, 1929 |
| 2,046,398 | McGowan | July 7, 1936 |
| 2,159,494 | Wright | Mar. 23, 1939 |

FOREIGN PATENTS

| Number | Country | Date |
|---|---|---|
| 471,194 | France | July 3, 1914 |
| 593,551 | France | May 29, 1925 |

OTHER REFERENCES

Improved Trailer Fittings, Popular Science Monthly, July, 1937, p. 85.